Jan. 7, 1964  D. G. WILSON  3,116,807
VEHICLE SPEED CONTROL
Filed Feb. 27, 1962
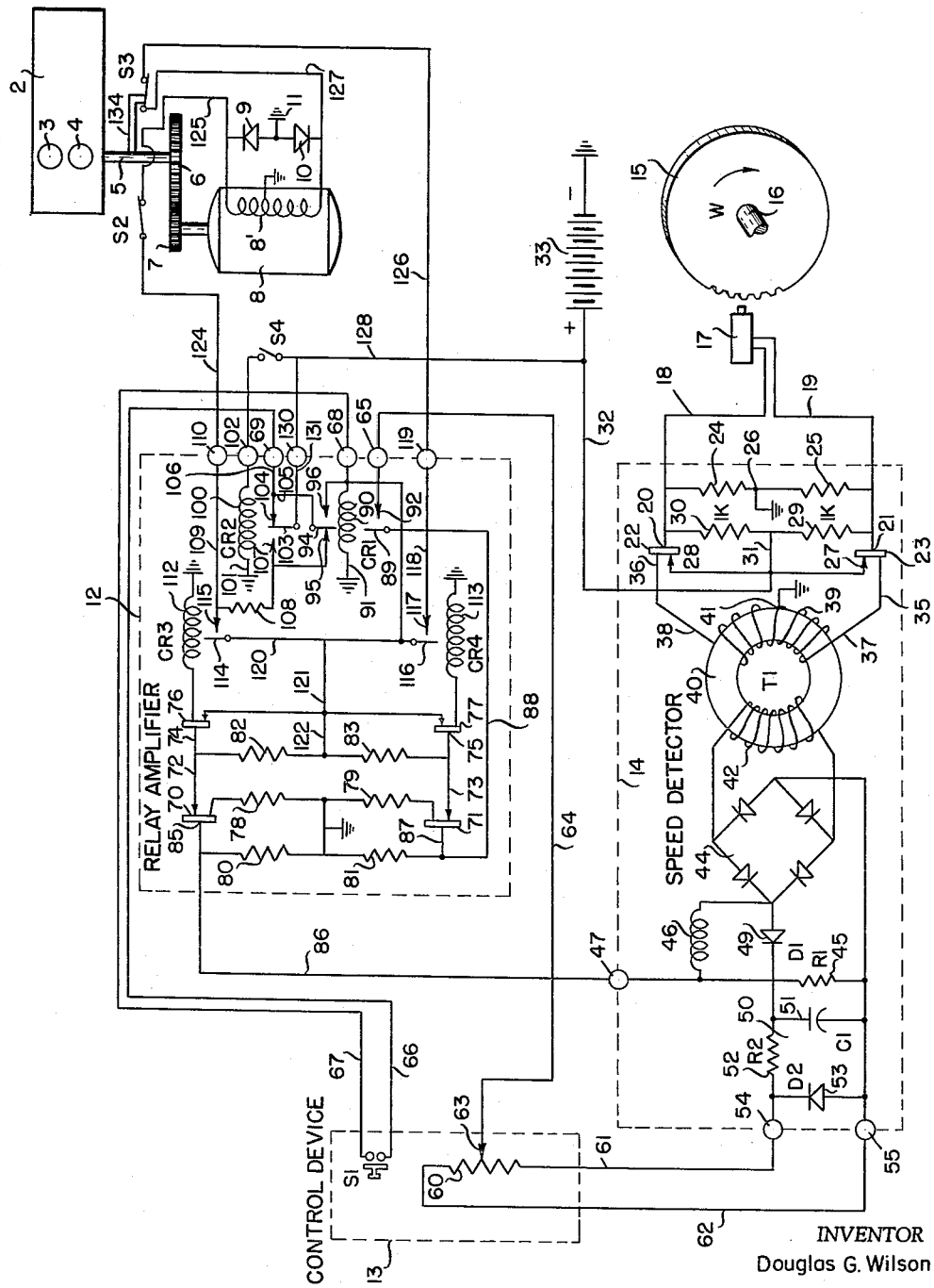
INVENTOR
Douglas G. Wilson
BY *F. J. Soucek*
ATTORNEY United States Patent Office 3,116,807
Patented Jan. 7, 1964

3,116,807
VEHICLE SPEED CONTROL
Douglas G. Wilson, Kokomo, Ind., assignor to General Motors Corporation, Detroit, Mich., a corporation of Delaware
Filed Feb. 27, 1962, Ser. No. 175,964
7 Claims. (Cl. 180—82.1)

This invention is directed generally to speed control apparatus for motor vehicles and, more particularly, to an electronic circuit for transforming the speed of a vehicle as determined, for example, by the rotation of the output shaft of the vehicle transmission into control voltages, and, in turn, utilizing these voltages to control the position of a throttle or other suitable speed governing device.

It has been found to be desirable to provide an adjustable and automatic speed control for automobiles and other vehicles while driving on a road having a regulated speed limit. Vehicle speed control devices are generally adapted for use on turnpikes or other high speed roads. It is therefore desirable that the device be accurate when employed to control the speed of the vehicle at the legal limit and that the operator be permitted to take complete manual control instantaneously without being distracted from controlling or steering the vehicle.

It is an object of this invention to provide means for automatically maintaining the speed of a vehicle to within plus or minus one mile per hour of a desired speed and further provide means whereby the operator may assume immediate manual control without being distracted from steering the vehicle.

Another object of the present invention is to provide means including the vehicle battery for converting the speed of a vehicle to a speed control voltage, the average value of which is virtually independent of the vehicle battery voltage.

It is a further object of the present invention to provide means for converting the speed of, for example, the output shaft of a vehicle transmission to a pair of voltages, one of which is constant and the other of which is proportional to the speed of the shaft, and to employ these voltages to control the position of the vehicle throttle valve.

It is a further object of the present invention to provide means actuated by the vehicle brake pedal for disengaging the automatic speed control system and for permitting the operator to retain full manual control of the vehicle.

The above and other objects will be apparent from the following detailed description when read with reference to the drawing which is a schematic and diagrammatic view of the control apparatus of the present invention.

In accordance with the present invention, a motor vehicle is provided with a primary and a secondary throttle valve. The secondary throttle valve is controlled by a servo motor which in turn is controlled by the difference between a first voltage that is proportional to the speed of the vehicle and a second voltage that is proportional to a desired vehicle speed.

Referring now to the drawing, the vehicle carburetor 2 is provided with a first manually controlled throttle valve 3 and a secondary throttle valve 4 that is connected by shaft 5, appropriate gears 6 and 7 to a servo motor 8. The servo motor 8 is of the reversible type and is provided with a winding 8' which may be either a pair of field windings or armature windings of the servo motor which windings have connected thereacross a pair of rectifiers 9 and 10 and a common grounded connection as indicated at 11. The means for applying a suitable actuating voltage to the motor to rotate the motor in either a forward or a reverse direction comprises a relay amplifier 12, a control device 13 and a speed detector 14. In order to simplify the understanding of the present invention each of these devices will be described separately.

Speed Detector

The speed detector 14 includes a serrated or toothed wheel 15 that is coupled through shaft 16 and suitable gearing to the output shaft of the car transmission (not shown). An inductive pickup device 17 is positioned adjacent the wheel 15 and is connected by leads 18 and 19 to the input or base electrodes 20 and 21 of a pair of transistor devices 22 and 23. A pair of input resistors 24 and 25 are connected between the lines 18 and 19 and are grounded at their common connection as indicated at 26. The emitter electrodes 27 and 28 are commonly connected to biasing resistors 29 and 30 through conductor 31 and are further connected through conductor 32 to a source 33 of D.C. voltage which is preferably a 12 volt source such as the vehicle battery. The output or base electrodes 35 and 36 are connected through conductors 37 and 38 to a primary winding 39 of a toroidal transformer 40. The winding 39 has a center tap 41 that is connected to ground and it is seen that the opposite ends of the primary winding are connected to the conductors 37 and 38. The secondary or output winding 42 of the transformer is connected to a full-wave D.C. rectifier 44. An output impedance such as resistor 45 is connected to rectifier 44 through a filter inductor 46. As will be more fully explained hereinafter there exists at point 47 a voltage having a value that varies with the speed of rotation of wheel 15.

A second rectifier 49 is connected between rectifier 44 and a peak charging network 50 includes a capacitor 51, a resistor 52 and a Zener diode 53. It is noted that rectifier 49 and resistor 52 are in series with one output lead of rectifier 44, and a condenser 51 and diode 53 are connected in parallel with the output leads of rectifier 44. As also will be explained further there exists at point 54 a constant voltage independent of the speed of rotation of wheel 15.

The speed detector device just described operates as follows: As wheel 15 rotates in proportion to the speed of the transmission output shaft, and accordingly in proportion to the speed of the vehicle, the serrations or teeth on wheel 15 rotate past the inductive pickup device 17 and generate a pulsating voltage in the pickup device having a frequency that is proportional to the speed of rotation of wheel 15. The pulses are applied from pickup device 17 through lines 18 and 19 to the base electrodes of transistors 22 and 23. The polarity of the pulse applied to transistor 22 is the reverse of the polarity of the pulse applied to transistor 23 and, accordingly, the transistors conduct alternately and cause a current to pass through lines 37 and 38 into the primary winding 39 of transformer 40 and through ground 41 back to the base electrodes of the transistors. It is thus seen that the current flowing through primary winding 39 is reversed in accordance with the frequency of the pulses applied to the transistors and, accordingly, the flux induced in the core of transformer 40, which core is a tape wound toroid of a magnetic material having a large remanent flux, is also reversed. In each instance the value of the current applied to the primary winding 39 is of a sufficient value to saturate the core. The core is therefore first magnetically saturated in one direction and then saturated in the reverse direction. For this purpose, the magnetic material is such that it has a relatively low coercive force.

Each time the saturation of the core is reversed an output pulse appears in the secondary winding 42 by the transformer. Since the voltage induced in the output winding 42 is proportional to the time integral of the voltage absorbed by the primary up to the instant of core saturation and since this voltage time integral is constant over the entire frequency range, the average value of the half-cycle secondary voltage will vary in proportion to vehicle speed.

The voltage appearing across winding 42 is a pulsating or alternating voltage that is applied to rectifier 44 where it is converted to a direct current voltage appearing at point 47 across output resistor 45 which latter voltage has a value proportional to the speed of wheel 15. An output impedance filter means is connected to the rectifier output and includes the inductor device 46 serially connected between rectifier 44 and resistor 45. The filter means filters the rectifier output voltage and prevents the voltage appearing at 47 from fluctuating rapidly. This maintains the voltage at a steady value that is proportional to the vehicle speed.

The peak charging network 50 provides at point 54 a voltage having a fixed value. This voltage is obtained by applying the output voltage from rectifier 44 through rectifier 49 to the capacitor 51 connected in parallel with the Zener regulating diode network comprising resistor 52 and diode 53. The capacitor 51 will charge to a peak value and maintain this charge. Should the charge on capacitor 51 tend to increase beyond the selected breakdown voltage of diode 53, the capacitor will discharge through diode 53 until the preferred peak value is again reached and the diode ceases to conduct in its reverse direction.

It can be seen that with respect to terminal 55 the speed detector 14 yields two output voltages. Terminal 47 provides a filtered D.C. voltage that is proportional to vehicle speed while terminal 54 provides a fixed voltage of a preselected value. This preselected value is determined by the capacity of capacitor 51 and the breakdown voltage of the Zener diode 53.

Control Device and Relay Amplifier

The control device 13 includes an output impedance device such as a potentiometer 60 having one end thereof connected through conductor 61 to terminal 54 and has its other end connected through conductor 62 to terminal 55. The variable arm 63 of the potentiometer is connected through a conductor 64 to a terminal 65 of relay amplifier 12. The control device 13 further includes a switch S1 having conductors 66, 67 connected to terminals 68 and 69 of the relay amplifier.

Relay amplifier 13 comprises a two-stage balanced transistor amplifier including transistors 70 and 71 which have their output leads 72 and 73 connected to the base terminals 74 and 75 of transistors 76 and 77. Suitable biasing resistors 78, 79 are provided for transistors 70 and 71 along with the base input resistors 80 and 81. Similarly, base or input resistors 82 and 83 are provided for transistors 76 and 77. The input resistors 80 and 81 are connected in series and form an amplifier input impedance arrangement across which inputs to the relay amplifier 12 are applied. Input or base electrode 85 of transistor 70 is connected to one side of resistor 80 and through conductor 86 to terminal 47 and the base electrode 87 of transistor 71 is connected to one side of resistor 81 and through conductor 88 to the armature 89 of a relay CR1. Relay CR1 has a coil 90 that has one end connected to ground as indicated at 91 and has its other end connected to terminal 68, and, consequently, to line 67 of the control device switch S1. Relay CR1 is further provided with a fixed contact 92 that is connected to terminal 65 and, consequently, to conductor 64 and potentiometer 60 in the control device 13. In addition CR1 is provided with a second armature 94 which is movable between two fixed contacts 95 and 96. Contact 96 is connected to terminal 68 and, therefore, to the ungrounded end of coil 90.

A second relay CR2 is provided in relay amplifier 12 that includes a coil 100 having one end grounded as indicated at 101 and having its other end connected to a terminal 102. Relay CR2 is provided with an armature 103 that normally engages a fixed contact 104 which is connected through line 105 to armature 94 of relay CR1 and is further connected through line 106 to terminal 69 and line 66 of switch S1 in the control device 13. A second fixed contact 107 is provided in relay CR2 and is connected through a resistor 108 and field conductor 109 to a terminal 110.

The output electrodes of transistors 76 and 77 are connected, respectively, to the coils 112 and 113 of a pair of relays CR3 and CR4. Relay CR3 is provided with an armature 114 and a fixed contact 115 which contact in turn is connected to the conductor 109 and terminal 110. Relay CR4 is provided with an armature 116 and a fixed contact 117 that is connected through line 118 to a terminal 119. The armatures 114 and 116 of relays CR3 and CR4 are connected by a conductor 120 and through a conductor 121 to the emitter electrodes of transistors 76 and 77. A conductor 122 connects these emitter electrodes to base resistors 82 and 83.

The relay amplifier 12 is connected from terminal 110 through a conductor 124, a switch S2, and a conductor 125 to the winding 8' of servo motor 8 and is further connected through terminal 119, conductor 126, switch S3 and conductor 127 to the winding 8'. The battery 33 is connected through line 128 to a terminal 130 of the relay amplifier which terminal in turn is connected through line 131 to the armature 103 of relay CR2. A cam member 134 is connected with the shaft 5 that actuates secondary throttle 4 o open switch S2 or switch S3 when the throttle is moved to either of its extreme positions. A switch S4 is connected between terminal 102 of the relay amplifier and conductor 128 leading to battery 33. The switch S4 is preferably operated by or in conjunction with the vehicle brake pedal, not shown. Switch S4 is normally open.

Operation

The vehicle speed regulator of the subject invention operates as follows: The constant voltage that appears between terminals 54 and 55 and that is applied across potentiometer 60, is a source of voltage from which a selected value corresponding to the desired speed, for example 40 m.p.h., may be taken and applied through potentiometer arm 63, through conductor 64 and terminal 65 to the fixed contact 92 of relay CR1. The voltage appearing between terminal 47 and terminal 55 is a variable voltage corresponding to vehicle speed that is applied through conductor 6 to the input or base electrode 85 of transistor 70. When it is desired to operate the vehicle by means of the vehicle speed regulator, and the desired speed of 40 m.p.h. has been approached, switch S1 of the control device 13 is closed to connect the coil 90 of relay CR1 to battery 33. This connection is made from line 67 of switch S1 to terminal 68 through coil 90 to the ground connection 91 through battery 33, conductor 128, terminal 130, line 131, armature 103 and fixed contact 104 of relay CR2, terminal 69 and line 66 of switch S1. Upon the actuation of relay CR1 armature 89 contacts fixed contact 92, and armature 94 contacts fixed contact 96. It is seen that by movement of armature 94 into engagement with contact 96, coil 90 of relay CR1 is connected in parallel with lines 66 and 67 of switch S1 through terminals 68 and 69. Accordingly, switch S1 may be released and relay CR1 will remain energized. The closing of armature 89 and fixed contact 92 of relay CR1 connects terminal 65 and, therefore, arm 63 of the potentiometer 60 to the base electrode 87 of transistor 71.

There is now applied to the two-stage relay amplifier a first voltage from potentiometer 60 that is proportional to the desired speed, 40 m.p.h., and a second voltage from terminal 47 that is proportional to the actual speed of the vehicle. The first and second voltages are combined across the input resistors 80 and 81 providing a resultant voltage which is either positive or negative with respect to the first voltage depending upon which of the two voltages is greater. As long as the first and second voltages are equal, the transistor amplifier, being balanced, will not conduct, and neither relay CR3 nor relay CR4 will be actuated. Should the speed of the vehicle exceed the desired speed, the voltage appearing at terminal 47 will increase above the selected voltage appearing on the arm 63 of the potentiometer. The resultant voltage difference across the input impedance arrangement including resistors 80 and 81 will cause the transistor 76 to conduct and relay CR3 will be actuated. Upon actuation of relay CR3, armature 114 will contact fixed contact 115 of relay CR3 and a D.C. voltage from battery 33 will be applied through conductor 128, terminal 130, line 131, armature 103, fixed contact 104, line 105, armature 94, fixed contact 96, line 120, line 109, terminal 110, line 124, switch S2 and line 125 to winding 8'. The application of this voltage to the servo motor 8 will cause the servo motor to rotate in such a direction as to close the secondary throttle 4 and thereby reduce the speed of the vehicle. Conversely, as the speed of the vehicle falls below the selected value of 40 m.p.h. the voltage appearing at terminal 47 will fall below that appearing at 63, transistor 77 will conduct, and relay CR4 will be actuated, rather than relay CR3. With relay CR4 actuated, a voltage will be applied from battery 33 through line 128, contacts 94 and 96 of relay CR1, contacts 116 and 117 of relay CR4, line 118, terminal 119, line 126, switch S3 and line 127 to coil 8'. It is seen that the voltage applied to winding 8' has been reversed and, consequently, the direction of rotation of the servo motor 8 is reversed in a direction to open the secondary throttle and cause the vehicle to increase in speed. As the voltage appearing at terminal 47 approaches that appearing at 63 the differential voltage across the resistors 80 and 81 applied to the relay amplifier approaches a null at which relay CR4 will drop out and the servo motor will be deenergized. Generally, after one or two corrections of the servo motor, the throttle valve 4 is positioned at the opening required to hold the car within plus or minus one mile per hour of the desired speed.

The switches S2 and S3 are cam operated limit switches to deenergize the motor at the extremities of the movement of valve 104 and thereby prevent jamming of the valve.

The speed regulating system can be disengaged at any time by depressing the brake pedal and closing switch S4 which switch may comprise the conventional pedal switch that energizes the vehicle stop lights. By closing switch S4 voltage is applied from battery 33 through line 128, switch S4 and terminal 102 to relay CR2. Actuation of relay CR2 opens contacts 103 and 104 and thereby disconnects battery 33 from holding relay CR1 and also applies battery voltage to the field winding of the servo motor in such a direction as to cause the throttle valve 4 to be closed. With the car at a standstill, the servo motor cannot be energized since there is no output voltage from the speed detector 14.

It is believed to be clear that in addition to providing a control voltage proportional to vehicle speed, the speed detector 14 may be employed as a speedometer to provide a visual indication of vehicle speed. This arrangement may be provided by connecting a suitable meter, such as one having an average reading meter movement, across the output of rectifier 44 and calibrating the meter to directly read vehicle speed.

What is claimed is:

1. In a device for controlling the speed of a vehicle, the combination comprising means for varying the speed of said vehicle, means for producing electrical impulses in accordance with the speed of said vehicle, means for converting said impulses to a first voltage having a value proportional to the actual speed of said vehicle, means for additionally converting said impulses to a second voltage proportional to a desired speed for said vehicle, said second voltage being constant and independent of the actual speed of said vehicle, means for combining said first and second voltages to obtain a third voltage having a given polarity when said first voltage is greater than said second voltage and having a reverse polarity when said first voltage is less than that of said second voltage, and means applying said third voltage to said means for varying the speed of said vehicle.

2. In a device for controlling the speed of a vehicle having a carburetor including a throttle valve, the combination comprising a reversible servomotor coupled to said throttle valve to vary the position of said valve in a direction to increase or decrease the speed of said vehicle, a source of voltage, first and second relays connected between said source of voltage and said servomotor, an electric circuit connected to said relays to actuate said relays individually, said circuit including an amplifier comprising at least two amplifying devices each having input and output electrodes, first and second amplifier input impedances connected in series between the input electrodes of said devices, means applying the difference between a first constant voltage proportional to a desired vehicle speed and a second variable voltage proportional to the actual speed of the vehicle to the input electrodes of said amplifier, whereby a voltage having a polarity that reverses as the value of said second variable voltage increases above or decreases below the value of said first constant voltage is developed across said input impedances, and means coupling said first relay to one of said output electrodes and said second relay to the other of said output electrodes.

3. In a device for obtaining a first constant voltage having an amplitude proportional to a desired vehicle speed and a second variable voltage having an amplitude proportional to actual vehicle speed, the combination comprising means for generating alternating positive and negative electric pulses having a frequency proportional to actual vehicle speed, a transformer having a magnetically saturable core, primary and secondary windings on said core, means for applying said positive pulses to one end of said primary winding, means for applying said negative pulses to the other end of said primary winding, said pulses having a voltage-time integral sufficient to saturate said core, rectifier means connected across said secondary winding, a first output circuit connected to said rectifier means and including a resistor across which there is developed the variable voltage having an amplitude proportional to actual vehicle speed, a second output circuit including a capacitor, a diode having a predetermined breakdown voltage, and a potentiometer, each connected in parallel across the output of said rectifier means, and means for obtaining from said potentiometer said constant voltage proportional to a desired vehicle speed.

4. In a device for obtaining a voltage having an amplitude proportional to the speed of a vehicle, the combination comprising, means for generating a series of alternating electric pulses having a frequency proportional to vehicle speed, a transformer including a core of magnetic material having a large remanent flux and further including a primary winding and a secondary winding, means for applying pulses of positive polarity from said series of pulses to one end of said primary winding, means for applying pulses of negative polarity from said series of pulses to the other end of said primary winding whereby the flux induced in said core is reversed and said core is alternately magnetically saturated in one direction and then in a reverse direction, a rectifier circuit connected to said secondary winding, and an impedance means connected to the output of said rectifier providing the voltage having an average value proportional to the frequency of said series of pulses appears.

5. The combination as defined by claim 4 wherein said impedance means includes an inductor and a resistor connected in series with means for providing an electrical connection to said impedance means at a point between said inductor and said resistor.

6. In a device for obtaining a voltage having an amplitude proportional to the speed of a vehicle, the combination comprising, means including a source of voltage for generating a series of alternating electric pulses having a frequency proportional to vehicle speed, a transformer including a core of magnetic material having a large remanent flux and further including a primary winding and a secondary winding, means for applying pulses of positive polarity from said series of pulses to one end of said primary winding, means for applying pulses of ngeative polarity from said series of pulses to the other end of said primary winding whereby the flux induced in said core is reversed and said core is alternately magnetically saturated in one direction and then in a reverse direction, a rectifier circuit connected to said secondary winding providing a voltage having an amplitude proportional to the speed of a vehicle, and an impedance means connected to the output of said rectifier across which a voltage having an average value that is virtually independent of said source of voltage appears.

7. The combination claimed in claim 6 wherein a peak voltage charging network including a capacitor and a diode having a predetermined breakdown voltage is connected between said rectifier and said impedance means.

References Cited in the file of this patent
UNITED STATES PATENTS

| | | |
|---|---|---|
| 2,841,745 | Shields | July 1, 1958 |
| 2,911,077 | Carter | Nov. 3, 1959 |
| 2,971,596 | Davis et al. | Feb. 14, 1961 |
| 3,036,562 | Scott | May 29, 1962 |

UNITED STATES PATENT OFFICE
CERTIFICATE OF CORRECTION

Patent No. 3,116,807 January 7, 1964

Douglas G. Wilson

It is hereby certified that error appears in the above numbered patent requiring correction and that the said Letters Patent should read as corrected below.

Column 2, line 31, after "50" insert -- that --; column 3, line 47, for "13" read -- 12 --; column 4, line 30, for "o" read -- to --; line 49, for "6" read -- 86 --; column 7, line 13, for "ngeative" read -- negative --.

Signed and sealed this 23rd day of June 1964.

(SEAL)
Attest:

ERNEST W. SWIDER
Attesting Officer

EDWARD J. BRENNER
Commissioner of Patents